United States Patent
Kruger et al.

(10) Patent No.: US 12,220,692 B2
(45) Date of Patent: *Feb. 11, 2025

(54) CALCINATION PROCESS

(71) Applicant: Origen Power Ltd, Walsall (GB)

(72) Inventors: Tim Kruger, Walsall (GB); Barrie Jenkins, Walsall (GB)

(73) Assignee: Origen Power Ltd, Walsall (GB)

( * ) Notice: Subject to any disclaimer, the term of this patent is extended or adjusted under 35 U.S.C. 154(b) by 723 days.

This patent is subject to a terminal disclaimer.

(21) Appl. No.: 17/598,197

(22) PCT Filed: Mar. 26, 2020

(86) PCT No.: PCT/GB2020/050806
§ 371 (c)(1),
(2) Date: Sep. 24, 2021

(87) PCT Pub. No.: WO2020/201720
PCT Pub. Date: Oct. 8, 2020

(65) Prior Publication Data
US 2022/0184574 A1 Jun. 16, 2022

(30) Foreign Application Priority Data
Mar. 29, 2019 (GB) .................................... 1904480

(51) Int. Cl.
| | | |
|---|---|---|
| *B01J 6/00* | (2006.01) | |
| *B01D 53/047* | (2006.01) | |
| *C01B 32/50* | (2017.01) | |
| *C01F 11/06* | (2006.01) | |

(52) U.S. Cl.
CPC ............ *B01J 6/001* (2013.01); *B01D 53/047* (2013.01); *C01B 32/50* (2017.08); *C01F 11/06* (2013.01); *B01D 2256/12* (2013.01)

(58) Field of Classification Search
None
See application file for complete search history.

(56) References Cited

FOREIGN PATENT DOCUMENTS

| | | |
|---|---|---|
| CN | 104129931 B | 12/2015 |
| CN | 105923635 B | 3/2019 |
| JP | 2003082361 A | 3/2003 |
| WO | WO 2006/009600 A2 | 1/2006 |
| WO | WO 2006/113673 A2 | 10/2006 |

OTHER PUBLICATIONS

European Patent Office, International Search Report and Written Opinion dated Aug. 6, 2020 for PCT application No. PCT/GB2020/050806 (9 pages).
Zehua et al., "Effect of Steam on Calcination-Carbonation Reactions of Calcium-Based CO2 Sorbent", Journal of Combustion Science and Technology, vol. 22, No. 4, Aug. 2016, 6 pages.

*Primary Examiner* — Stefanie J Cohen
(74) *Attorney, Agent, or Firm* — Sunstein LLP

(57) ABSTRACT

A process comprising the following steps: a) calcination of a metal carbonate by combustion of a fuel in the presence of a mixture of oxygen, water vapour and carbon dioxide, to generate a metal oxide, water vapour, carbon dioxide and heat; b) using the heat generated to drive an oxygen generation reaction; and c) use of the oxygen generated in step b) in calcination step a). The use of the process on carbon dioxide sequestration and/or in oxygen generation.

16 Claims, 3 Drawing Sheets

CALCINATION PROCESS

CROSS-REFERENCE TO RELATED APPLICATIONS

This application is the national phase entry of international patent application number PCT/GB2020/050806 filed Mar. 26, 2020 and claims the benefit of United Kingdom patent application number 1904480.9 filed Mar. 29, 2019, the disclosures of which are incorporated herein by reference in their entirety.

The invention relates to a calcination process, in particular to a calcination process with subsequent or simultaneous sequestration of carbon dioxide. Further, the invention relates to a calcination process, where heat energy generated during calcination can be used to generate oxygen, which can be fed back into the system, or to compress the gaseous carbon dioxide generated from the calcination process.

Notwithstanding the awareness of issues such as global warming, and the limited natural resources available, there is still a huge demand for industrial processes which rely on these resources. In order to meet this demand, and simultaneously combat climate change, there is a need for more technological innovation in the energy sector, in particular in the development of carbon neutral industrial processes.

Calcination is an important industrial process because it generates metal oxides, which are extremely versatile and can be used across a wide range of different applications, such as cement and concrete manufacture, catalysis, water purification and thermal insulation. However, the calcination of metal oxides is a major cause of greenhouse gas emissions For instance, in the calcination of limestone ($CaCO_3$) to produce lime (CaO), the carbon dioxide produced is often simply released to the atmosphere. It has been estimated that limestone calcination alone contributes to around 5% of global carbon dioxide emissions, equating to around 1.5 billion tonnes of emissions per annum. Usually, limestone is calcined in a lime kiln by the combustion of natural gas in air. The natural gas reacts with the oxygen in the air, generating heat which is used to raise the temperature in the kiln to a sufficiently high temperature to cause the limestone to calcine. However, this process results in the production of a flue gas, which is a mixture containing carbon dioxide and a high proportion of nitrogen. Sequestration of this carbon dioxide requires the separation of carbon dioxide from other flue gases, especially nitrogen. This additional purification step is both energy-intensive and costly. As a result, sequestration is often not attempted at all. Artificial processes have been developed for the capture and sequestration of industrial carbon dioxide. For example, carbon sequestration has been used to create a carbon neutral calcination process (EP 3 027 713 B1). However, the calcination process described requires the use of fuel cells, which are expensive to manufacture. As such, it would be advantageous to provide a calcination method in which the carbon dioxide produced could be captured and if appropriate, sequestered without the need for complex equipment or processing of the carbon dioxide.

The invention is intended to overcome or ameliorate at least some aspects of the above problems.

Accordingly, in a first aspect of the invention there is provided a process as defined in claim 1 comprising the following steps:
a) calcination of a metal carbonate by combustion of a fuel in the presence of a mixture of oxygen, water vapour and carbon dioxide, to generate a metal oxide, water vapour, carbon dioxide and heat;
b) using the heat generated to drive an oxygen generation reaction; and
c) use of the oxygen generated in step b) in calcination step a).

It has surprisingly been found that this process can be used to produce high-purity carbon dioxide, which can be directly sequestered, and can be used to generate high-purity oxygen without the need for electricity, resulting in both an energetically and economically valuable process. In addition, in conventional processes (such as in a lime kiln), the fuel is generally burned in air. The flue gas from such a reaction typically comprises a large proportion of nitrogen, making separation from the flue gases of conventional calcination both costly and energy-intensive. Therefore, the process of the invention is advantageous as nitrogen is not introduced.

As used herein, the term "fuel" may be used to describe any material which can be burned to generate power. Typically, the fuel of step a) is selected from coal, coke, syngas, biomass, biogas, or one or more hydrocarbons, or a combination thereof. Preferably, the fuel of step a) comprises a "clean" fuel, by which it is intended to mean a fuel that produces products which are clean, pure and easy to separate with minimal solid waste (such as slag). Examples of this include syngas, gasohol, liquid petroleum gas, and other hydrocarbon fuels. Often the clean fuel will be primarily hydrocarbon based, usually comprising one or more alkanes, as is the case with liquid petroleum gas. Typically, the one or more alkanes are gaseous at STP (standard temperature and pressure).

For step a), the mixture of water vapour, oxygen and carbon dioxide may be sourced from purified air. Air entering the system can be purified and separated into two streams: a stream that comprises predominantly nitrogen, and a stream that comprises predominantly oxygen. The stream comprising oxygen could then be used as the oxygen source for calcination step a).

The introduction of water vapour into the calcination unit serves three main purposes:
(i) As is the case with carbon dioxide, the water vapour can act as a non-reactive diluent to lower the flame temperature of combustion. In conventional lime kilns, this diluent function is provided by nitrogen, but, as mentioned previously, the disadvantage of using nitrogen as a diluent is that it has to be separated from the flue gas if pure carbon dioxide is required. This separation process is costly and difficult. When mixed with water vapour, the extraction of carbon dioxide is simple to achieve by cooling the mixture of gases to a point at which the water vapour condenses to liquid water.
(ii) Water vapour also serves to reduce the partial pressure of carbon dioxide in the gas mixture at the point of calcination. Le Chatelier's Principle indicates that a higher partial pressure of one of the products of the calcination reaction (namely carbon dioxide) will act to inhibit the reaction. The introduction of a proportion of water vapour into the gas mixture can act to restrict the partial pressure of carbon dioxide and thereby reduce the extent of this inhibition.
(iii) Further, the presence of water vapour has been shown to have a catalytic effect on the kinetics of the calcination of calcium carbonate, resulting in a lower temperature at which the calcination reaction occurs. This results in a reduction in the cost and energy requirements of the calcination reaction.

Where the fuel comprises a hydrocarbon, step a) of the process can also be expressed as follows:

(i) $C_nH_{2n+2} + aO_2 \rightarrow bCO_2 + cH_2O + \Delta$ (ii) $MCO_3 + \Delta \rightarrow MO + CO_2$   a)

where n may be an integer from 1 to 5; a, b and c are integers; M is a metal as described in detail below; and Δ represents heat. Often a, b and c follow the relationship a=1.5n+0.5, b=n, c=n+1 where often n=1.

Therefore, when the fuel comprises a hydrocarbon, the gaseous products of the combustion reaction (i) and calcination reaction (ii) comprise carbon dioxide and water vapour. Where the fuel consists of a hydrocarbon, the products of the combustion and calcination reactions are almost entirely carbon dioxide and water vapour, providing an easily purified and reutilised product stream that can be separated from the solid products with ease. Often the gaseous stream will comprise carbon dioxide and water vapour, and the solid stream will comprise the metal oxide generated in reaction (ii). The gas may then be cooled, and some or all (often only a proportion) may be mixed with high-purity oxygen and fuel, for use in step a). As described above, the benefit of this is that the carbon dioxide and water vapour acts as diluents, reducing the flame temperature of combustion; the water vapour present reduces the partial pressure of carbon dioxide, which subsequently reduces the inhibitory affect carbon dioxide would otherwise have on calcination; and the reintroduction of water vapour also acts catalytically to increase the kinetics of the calcination reaction.

Where the fuel is methane, and the metal carbonate is calcium, the reactions will follow the formulae:

(i) $CH_4 + 2O_2 \rightarrow CO_2 + 2H_2O + \Delta$ (ii) $CaCO_3 + \Delta \rightarrow CaO + CO_2$   a)

where Δ(i) is 890 kJ/mol and Δ(ii) is 178 kJ/mol.

Where an alternative hydrocarbon, such as a $C_2$ to $C_5$ alkane, is involved in the combustion reaction, the stoichiometry of chemical equation (i) will differ.

Where an alternative metal carbonate is used, the calcination reaction (ii) will simply liberate an alternative metal oxide. If the metal of the metal carbonate is a group II metal, the stoichiometries of the reaction will be the same as above for calcium carbonate.

As described above, step a) is a calcination reaction, wherein a metal carbonate is calcined (i.e. heated to a sufficient temperature such that it thermally decomposes) to a metal oxide and carbon dioxide by the heat generated in the combustion of a fuel in the presence of a mixture of carbon dioxide, water vapour and oxygen. Combustion is an exothermic reaction, and the heat energy generated from combustion of a fuel is sufficiently high to calcine the metal carbonate. Step a) of the process claimed takes place in a furnace, kiln, calciner or the like, often in a kiln It should be noted that, as used herein, references to the energies required to drive a reaction, or which is released from a reaction, as cited in $kJmol^{-1}$ are the enthalpy calculations at standard temperature and pressure.

Typically, the calcination reaction of step a) takes place in the range of 800° C. and 1350° C., on many occasions in the range of 900-1250° C., or in the range of 1000-1150° C. These ranges are preferred to balance the need to activate the endothermic calcination reaction of step a) with the desire to supply only the energy necessary to provide the reaction temperatures needed, thereby minimising energy wastage.

As described above, carbon dioxide and/or steam or flue gases may be added to the calcination mixture, diluting the oxygen and lowering the overall flame temperature of the reactant gas stream of the combustion reaction of step a). This is beneficial, as combustion in pure oxygen generates a combusted gas that is hotter than that required for the calcination reaction, and the presence of a diluent stabilises the combustion process to meet the requirements of the calcination reaction temperature ranges. Moreover, if the flame temperature is too high, it may reduce the lifetime of combustion apparatus. In addition, if the calcination temperature is too high, then the resulting metal oxide may sinter, resulting in low reactivity, which would make it unsuitable for many markets.

By using carbon dioxide and/or steam or flue gases as the diluent, the product gas stream of the calcination reaction is not contaminated. Further, the carbon dioxide and/or flue gases produced in the reaction can be recycled for use as the diluent, removing the need for, and cost of, a separate diluent.

Typically, the heat generated in step a) may also be used to compress the carbon dioxide generated in step a) and/or step b). In order to sequester carbon dioxide, it is necessary to compress it to a supercritical state in a series of compression steps, which requires a large amount of energy. Customarily, compression of carbon dioxide is achieved using electrically-driven compressors, which contributes to the carbon footprint and is also a financial burden. An advantage of the process is that more energy is produced than is required to generate oxygen (as per step b). Therefore, surplus energy is available to drive other processes within the system. For instance, some or all of the surplus energy could be used to compress carbon dioxide generated in step b).

Typically, the metal of the metal carbonate in the calcination reaction of step a) is a group II metal or a combination thereof. Often, the metal carbonate is magnesium carbonate, calcium carbonate, dolomite or combinations thereof. Most often the metal carbonate is calcium carbonate as this compound is readily available and inexpensive.

Group II metals are generally used, as group II metal cations have a higher charge density and a greater polarising power than, for instance, group I metal cations. Therefore, the C—O bond in the group II carbonates is more polar covalent, meaning the bond is weaker and subsequently easier to break down.

Often the source of calcium carbonate is limestone, for cost and availability reasons. Where magnesium carbonate is used, the source can be hydrated magnesium carbonate or dehydrated magnesium carbonate (magnesite), the choice being determined by factors such as regional availability.

Typically, the fuel used in the combustion reaction in step a) comprises one or more alkanes. Preferably, the one or more alkanes is gaseous at STP, often selected from methane; ethane; propane; butane, gaseous isomers of pentane, such as neopentane (2,2-dimethylpropane); and combinations thereof. Preferably, the one or more alkanes is selected from methane, ethane, propane and butane. Most preferably, the one or more gaseous alkane comprises methane. The gaseous alkanes may be compressed prior to use for ease of storage and transportation.

As a result of its higher hydrogen/carbon ratio, methane has a higher heat of combustion per gram compared to longer chain gaseous alkanes despite having a lower molar enthalpy change of combustion at STP. Table 1 displays the relative enthalpy of combustion of methane, ethane, propane, butane and pentane.

| Alkane | Chemical Formula | M g mol⁻¹ | $H_c^{\ominus}$ kJ mol⁻¹ | Enthalpy per g kJ/g |
|---|---|---|---|---|
| Methane | $CH_{4(g)}$ | 16.0 | −890.3 | −55.6 |
| Ethane | $CH_3CH_{3(g)}$ | 30.1 | −1559.7 | −51.82 |
| Propane | $CH_3CH_2CH_{3(g)}$ | 44.1 | −2219.2 | −50.3 |
| Butane | $CH_3(CH_2)_2CH_{3(g)}$ | 58.1 | −2876.5 | −49.5 |
| Pentane | $CH_3(CH_2)_3CH_{3(l)}$ | 72.2 | −3509.1 | −48.6 |

Typically, the gaseous alkane may be sourced from natural gas, shale gas, coal gas or biogas. These gases are more economical and have a greater lifespan compared to other fossil fuels. Often, the gaseous alkane is sourced from natural gas. Natural gas is predominantly composed of methane, and, whilst it is not as clean as renewable energy sources, it is considerably more environmentally friendly than other fossil fuels.

As stated above, the heat generated in step a) can be used to drive the oxygen generation step b). Typically, the oxygen generation reaction of step b) comprises a gas separation process, extracting oxygen from air, however other oxygen generation reactions may also be used. Often, the oxygen produced will be high purity oxygen. Often, the oxygen generation reaction of step b) will be a gas separation process, which may occur in an Air Separation Unit (ASU) or in a Pressure Swing Adsorption (PSA) system. Preferably, the oxygen generation reaction of step b) takes place in a Pressure Swing Adsorption (PSA) system.

In general, ASU and PSA systems operate by electricity, which is a high value energy source. However, in the process claimed, the oxygen can be generated using heat energy released from the process steps of the invention. For instance, the heat energy may be heat released on cooling of the products of the calcination process, namely the metal oxide and carbon dioxide, to ambient temperature. Alternatively, heat energy from a condensation process to extract carbon dioxide from water vapour may be used. As a result, a more energetically and economically favourable method of oxygen generation is achieved. A PSA system is particularly advantageous as such systems are more stable to fluctuations in energy supply.

Further, oxygen generated in step b) of the process claimed is not wasted, as the oxygen generated is of high purity and can be recycled into the combustion reaction of step a). Further, as oxygen has many industrial uses, any surplus oxygen generated can be removed and used for other industrial or commercial purposes.

In addition, the claimed process is advantageous over conventional oxy-fuel combustion (i.e. combustion of methane to generate heat, which is then converted to electricity), as a higher amount of pure carbon dioxide is generated per unit of oxygen. The combustion of methane liberates one mole of carbon dioxide, whereas the calcination of a group II metal oxide in conjunction with combustion of methane liberates four moles of carbon dioxide, such that an overall reaction mechanism between methane and calcium carbonate would be:

$$CH_4 + 2O_2 + 3CaCO_3 \rightarrow 3CaO + 2H_2O + 4CO_2$$

This results in sufficient energy being released by the combustion of a mol of methane (890 kJ/mol) to calcine three mols of calcium carbonate (at 178 kJ/mol each), having taken into account heat losses and inefficiencies of the system.

The gaseous mixture generated in step b) comprises carbon dioxide and water vapour. In order to generate high purity carbon dioxide, the gaseous mixture may be cooled, so that steam condenses out as liquid water. Carbon dioxide obtained after separation from water vapour is pure and is therefore suitable for direct sequestration without the need for additional purification or drying steps. As used herein, the term "pure", regardless of the substance to which it is applied, may mean that the substance has in the range 0% to 5% impurities, at most 1%, often in the range 0.0001% to 1%, or 0.001% to 0.5% impurities (i.e. it is 95% to 100% pure, often 99% to 99.9999% or 99.5% to 99.999% pure).

The process of the invention may also comprise an additional step d), wherein the metal oxide generated in step a) is hydrated to produce a metal hydroxide and heat. In such cases the reaction process of step d) would be:

$$MO + H_2O \rightarrow M(OH)_2$$

The water of hydration may be the water vapour produced in step a), or it may be from another source. The water vapour generated in step a), which is not used in hydration of the metal oxide will often be cooled and collected for use in other applications.

Where, for instance, the metal oxide is calcium oxide, additional step d) will follow the formula:

$$CaO + H_2O \rightarrow Ca(OH)_2$$

Hydration of a metal oxide is an exothermic reaction, generating heat energy. The heat energy generated in this additional step can be collected and put back into the system. Further, metal hydroxides have a wide range of uses in various different technical fields. Calcium hydroxide may be used as a flocculent in the treatment of sewage water, to produce sodium hydroxide in the paper industry (the Kraft process) or in the dental industry, and magnesium hydroxide can be used in antacids, laxatives or antiperspirant.

Typically, the oxygen and/or carbon dioxide used in the combustion reaction of step a) has a purity of 95% or greater, often 99% or greater. As mentioned previously, traditional calcination of limestone takes place by combustion of natural gas in air and the resulting flue gas from this process is a mixture of carbon dioxide and nitrogen gas. As such, to obtain carbon dioxide of sufficient purity for sequestration, separation of the mixture is required, which is both energy-intensive and costly. However, combustion of a fuel in a mixture of high purity oxygen and high purity carbon dioxide will result in a pure carbon dioxide product gas stream, allowing for the direct sequestration of carbon dioxide from step a). Therefore, there is no energy penalty resulting from the need to purify or concentrate the carbon dioxide prior to storage, as would be the case for carbon dioxide released from conventional flue gases from power plants or calcination processes.

Typically, the oxygen generated in step c) has a purity of 95% or greater. Generation of pure oxygen in step c) could be said to provide a form of closed-loop system with respect to the oxygen, whereby the oxygen generated (for instance, by separation from air) can be re-introduced into the combustion reaction of step a), meaning that in some modes of use, no gasses are released into the atmosphere during the entire process. As a result, the process could be said to be carbon neutral. Moreover, where the metal carbonate is calcium carbonate, lime produced can re-carbonate using atmospheric carbon dioxide, which would result in a carbon negative process.

According to a second aspect of the invention there is provided a use of the process of the first aspect of the invention in carbon dioxide sequestration. The sequestration techniques used will generally be conventional and well known to those skilled in the art often sequestration will be geological sequestration.

In a third aspect of the invention, there is provided a use of the first aspect of the invention in oxygen generation, in particular in the generation of high purity oxygen. The oxygen generated is of sufficient purity for storage and use in further industrial or commercial applications, such as steel manufacture for example.

Unless otherwise stated, each of the integers described may be used in combination with any other integer as would be understood by the person skilled in the art. Further, although all aspects of the invention preferably "comprise" the features described in relation to that aspect, it is specifically envisaged that they may "consist" or "consist essentially" of those features outlined in the claims. In addition, all terms, unless specifically defined herein, are intended to be given their commonly understood meaning in the art.

Further, in the discussion of the invention, unless stated to the contrary, the disclosure of alternative values for the upper or lower limit of the permitted range of a parameter, is to be construed as an implied statement that each intermediate value of said parameter, lying between the smaller and greater of the alternatives, is itself also disclosed as a possible value for the parameter. Finally, references to percentage, in particular with regard to purity relate to weight % (wt %) of the product.

In addition, unless otherwise stated, all numerical values appearing in this application are to be understood as being modified by the term "about".

BRIEF DESCRIPTION OF THE DRAWINGS

In order that the present invention may be more readily understood, it will be described further with reference to the figures.

DETAILED DESCRIPTION

Figure 1:
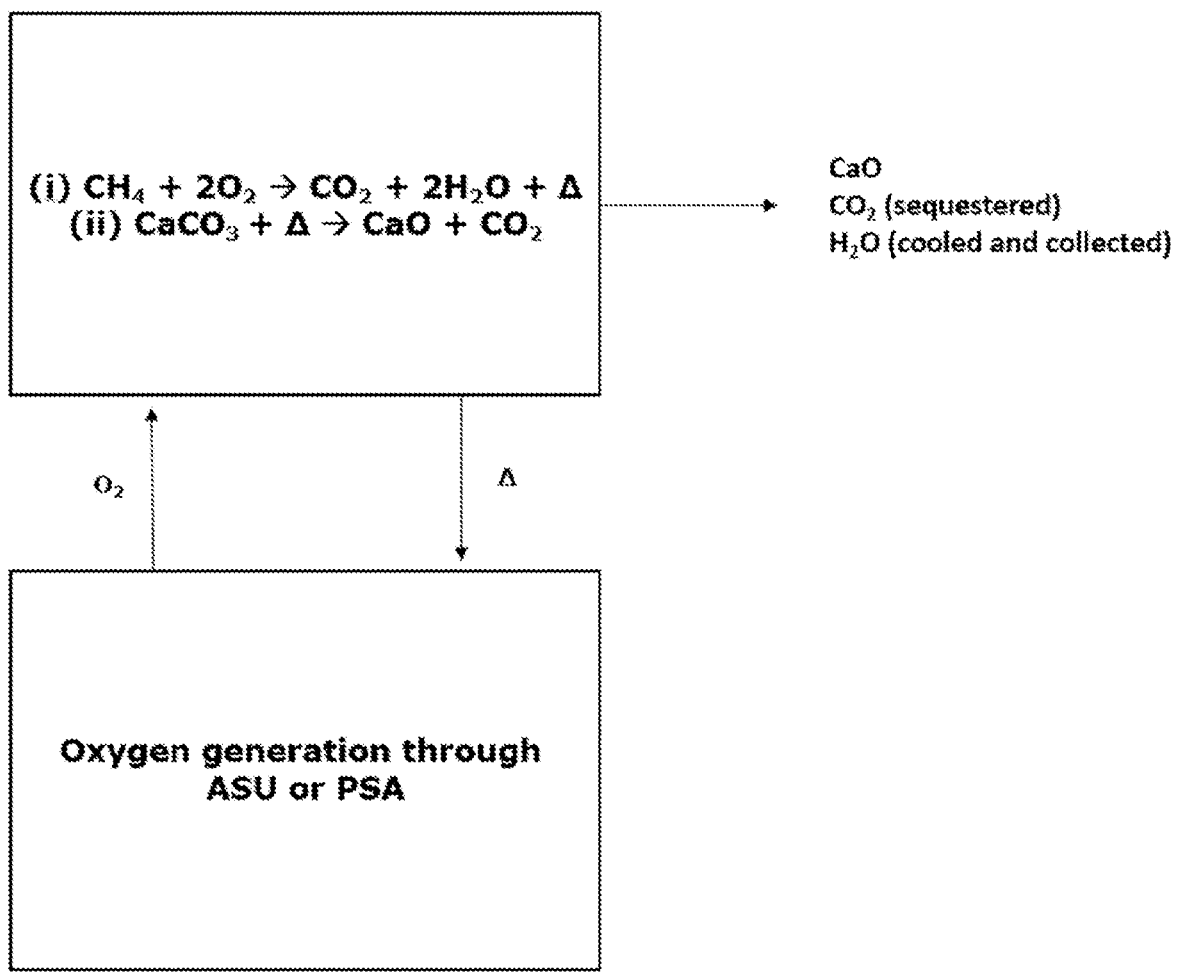
FIG. 1 is a schematic representation of a process according to the invention.

FIG. 1 shows the process of the invention, comprising step a), in which calcium carbonate is calcined via combustion of methane in the presence of oxygen and carbon dioxide. This results in the generation of calcium oxide, a pure stream of carbon dioxide, and water. The carbon dioxide generated can be separated from water vapour, and then directly sequestered, resulting in a carbon neutral system. The calcium oxide generated is cooled to ambient temperature and the heat energy released is then used to drive an oxygen generation reaction by a PSA system. The oxygen generation can be fed back into step a), resulting in a form of closed loop system in which in some modes of operation no gases are released to the atmosphere.

Figure 2:
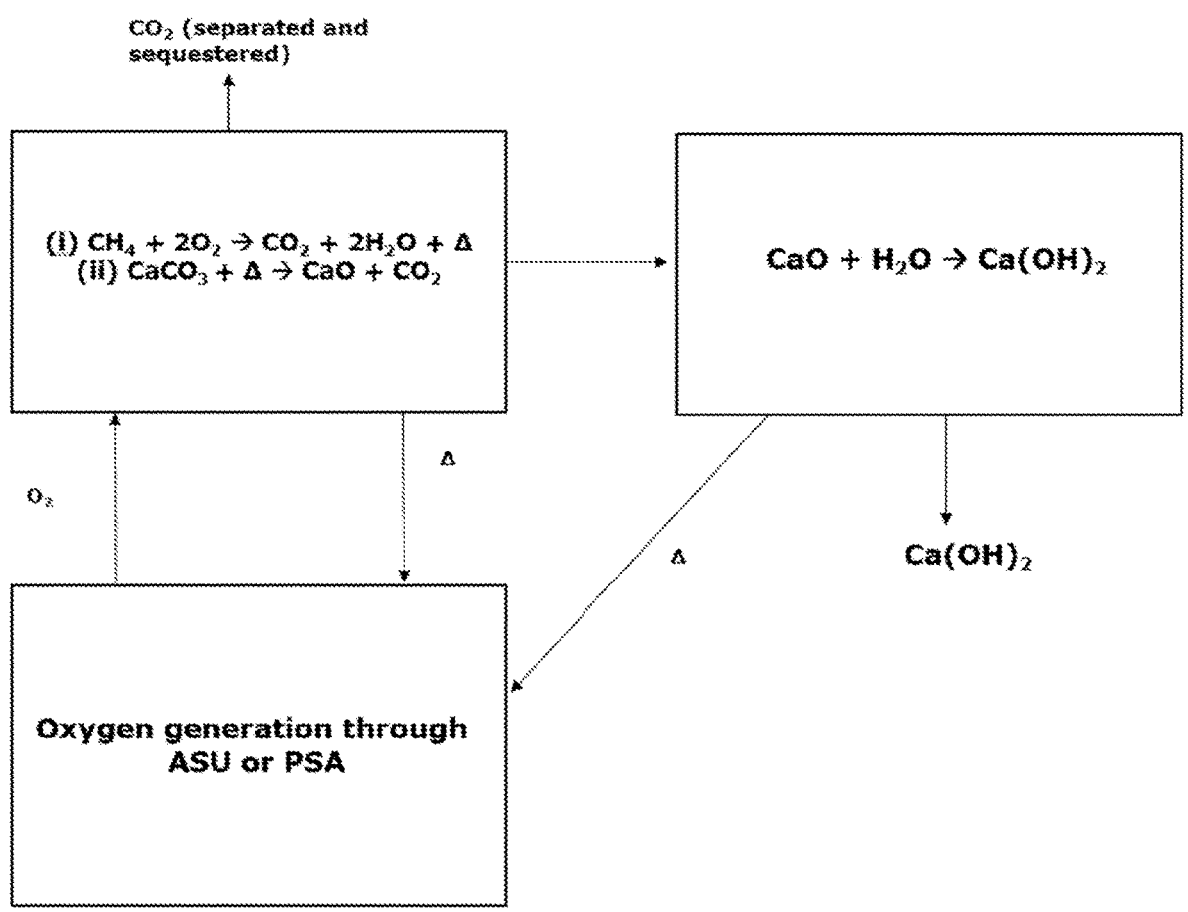
FIG. 2 is a schematic representation of a process according to the invention, further comprising additional step d)

FIG. 2 shows the process of the invention as outlined in FIG. 1, with the addition of step d). The calcium carbonate generated in step a) can be subsequently hydrated, forming calcium hydroxide (slaked lime), which is an exothermic reaction. The energy released in the hydration of calcium oxide can also be fed into the oxygen generation reaction.

Figure 3:
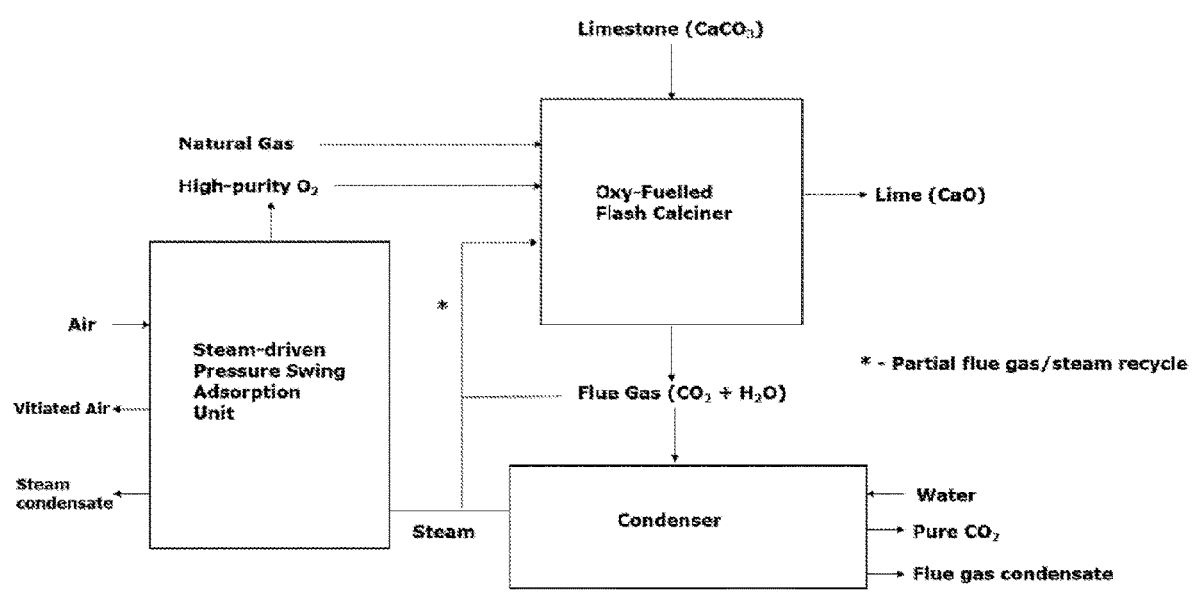
FIG. 3 is a schematic representation of a process according to the invention, further comprising additional step d) and using natural gas as the fuel.

FIG. 3 shows the process of the invention comprising step a), in which calcium carbonate is calcined via combustion of natural gas in the presence of oxygen and carbon dioxide. This results in the generation of calcium oxide, and a stream of carbon dioxide and water vapour. The carbon dioxide and water vapour is then transferred to a condenser, where pure carbon dioxide is separated and can then be sequestered. The steam released from the condenser can then be partly recycled in the system, and also partly used to drive an oxygen generation reaction by a PSA system. The oxygen generated can be fed back into step a), resulting in a form of closed loop system, as described above.

The invention claimed is:

1. A process comprising:
    (a) performing calcination of a metal carbonate by combustion of a fuel in the presence of a mixture of oxygen, water vapour and carbon dioxide, to generate a metal oxide, water vapour, carbon dioxide and heat;
    (b) using the heat generated to drive an oxygen generation reaction; and
    (c) using oxygen from the oxygen generation reaction of step (b) in the performing calcination of step (a).

2. The process according to claim 1, using the heat generated in step (a) to compress the carbon dioxide generated in step (a).

3. The process according to claim 1, wherein the metal of the metal carbonate in step (a) is selected from the group consisting of a group II metal and a combination of group II metals.

4. The process according to claim 3, wherein the metal carbonate in step (a) is selected from the group consisting of magnesium carbonate, calcium carbonate, dolomite and combinations thereof.

5. The process according to claim 4, wherein the metal carbonate in step (a) comprises calcium carbonate.

6. The process according to claim 1, wherein the fuel of step (a) comprises a component selected from the group consisting of coal, coke, syngas, biomass, biogas, or one or more hydrocarbons, and combinations thereof.

7. The process according to claim 6, wherein the fuel of step (a) comprises at least one hydrocarbon.

8. The process according to claim 1, wherein the oxygen generation reaction of step (b) comprises a gas separation process which occurs in an environment selected from the group consisting of an Air Separation Unit (ASU) and a Pressure Swing Adsorption (PSA) System.

9. The process according to claim 8, wherein the oxygen generation reaction of step (b) occurs in a Pressure Swing Adsorption (PSA) system.

10. The process according to claim 1, further comprising sequestering the carbon dioxide generated in step (a).

11. The process according to claim 1, further comprising (d) hydrating the metal oxide generated in step (a) to produce a metal hydroxide and heat.

12. The process according to claim 1, further comprising using the heat generated during hydration of the metal oxide to drive the generation of oxygen in step (b).

13. The process according to claim 1, wherein a composition selected from the group consisting of the oxygen and the carbon dioxide and combinations thereof used in the combustion reaction of step (a) is greater than 95% pure.

14. The process according to claim 1, wherein oxygen generated in step (c) is greater than 95% pure.

15. The process according to claim 1, further comprising sequestering carbon dioxide generated in the recited processes.

16. The process according to claim 1, further comprising collecting the oxygen generated.

\* \* \* \* \*